United States Patent

McBurney et al.

(10) Patent No.: US 7,200,414 B2
(45) Date of Patent: Apr. 3, 2007

(54) CLIENT-AIDING WITH CELLPHONES IN A 150-KM RADIUS AREA

(75) Inventors: Paul W. McBurney, San Francisco, CA (US); William J. Morrison, San Francisco, CA (US)

(73) Assignees: Seiko Epson Corporation, Tokyo (JP); eRide, Inc., San Francisco, CA (US)

( * ) Notice: Subject to any disclaimer, the term of this patent is extended or adjusted under 35 U.S.C. 154(b) by 576 days.

(21) Appl. No.: 10/215,138

(22) Filed: Aug. 7, 2002

(65) Prior Publication Data

US 2004/0192334 A1 Sep. 30, 2004

(51) Int. Cl.
*H04B 15/00* (2006.01)
*H04B 7/00* (2006.01)
*H04B 17/00* (2006.01)
*H04Q 7/20* (2006.01)
*G01S 1/00* (2006.01)

(52) U.S. Cl. ............. 455/502; 455/67.11; 455/67.16; 455/456.1; 342/356; 342/357.05; 342/357.06; 342/357.1; 342/357.12

(58) Field of Classification Search ............ 455/67.11, 455/67.16, 456.1, 456.5, 456.6, 457, 502, 455/265; 342/356, 357.05, 357.06, 357.1, 342/357.12

See application file for complete search history.

(56) References Cited

U.S. PATENT DOCUMENTS

| | | | |
|---|---|---|---|
| 5,917,444 A | 6/1999 | Loomis et al. | |
| 6,070,078 A | 5/2000 | Camp, Jr. et al. | |
| 6,281,837 B1 | 8/2001 | Richton et al. | |
| 6,313,786 B1 * | 11/2001 | Sheynblat et al. | 342/357.02 |
| 6,323,804 B1 * | 11/2001 | Kurby et al. | 342/357.06 |
| 6,658,258 B1 * | 12/2003 | Chen et al. | 455/456.1 |
| 6,813,500 B1 * | 11/2004 | Ciganer et al. | 455/456.1 |
| 2002/0005801 A1 | 1/2002 | Lyusin | |
| 2002/0123352 A1 * | 9/2002 | Vayanos et al. | 455/456 |
| 2002/0168988 A1 * | 11/2002 | Younis | 455/456 |

FOREIGN PATENT DOCUMENTS

| | | |
|---|---|---|
| EP | 0 874 248 | 10/1998 |
| EP | 1 203 965 | 5/2002 |

* cited by examiner

*Primary Examiner*—George Eng
*Assistant Examiner*—Un C. Cho

(57) ABSTRACT

A cellphone system comprises a GPS reference station located with a telephone cell site. Such GPS reference station tracks the GPS satellites visible to its local area and estimates the Doppler for each such GPS satellite. The system also includes mobile GPS receivers and cellphones that move around and through the operational area of the cell site. It is assumed that the satellite Dopplers seen by the GPS reference station will have insubstantial differences with the true Dopplers observed by other GPS receivers operating within the cell site's service area. The Doppler estimates are thus routinely communicated over a wireless telephone channel to the mobile GPS receivers and cellphones that register locally. Such mobile GPS receivers then can confidently adopt the surrogate Doppler estimates as a center starting point for their initialization frequency searches. The time required for such mobile GPS receivers and cellphones to initialize and provide a first fix is thereby substantially reduced.

9 Claims, 2 Drawing Sheets

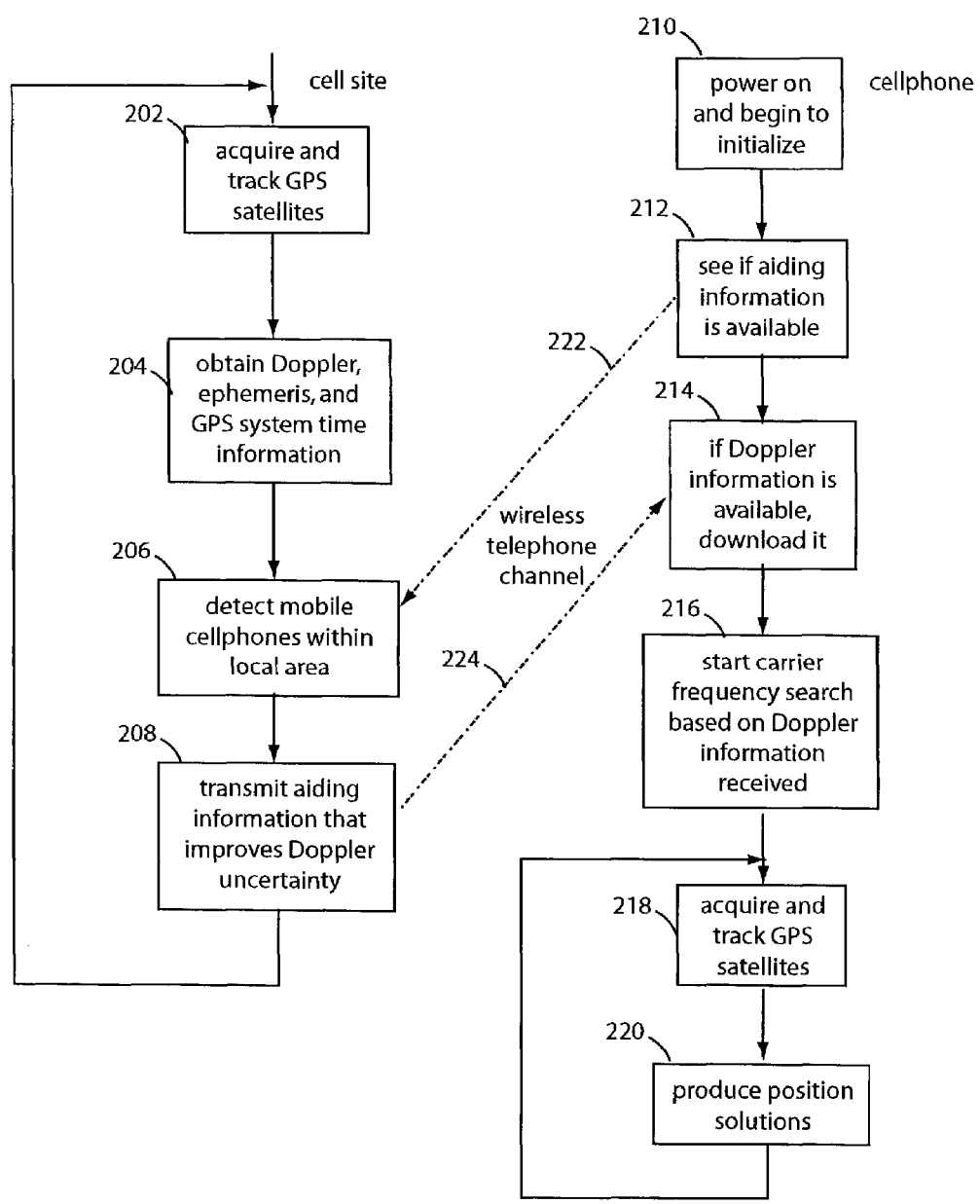

CLIENT-AIDING WITH CELLPHONES IN A 150-KM RADIUS AREA

FIELD OF THE INVENTION

Figure 1:
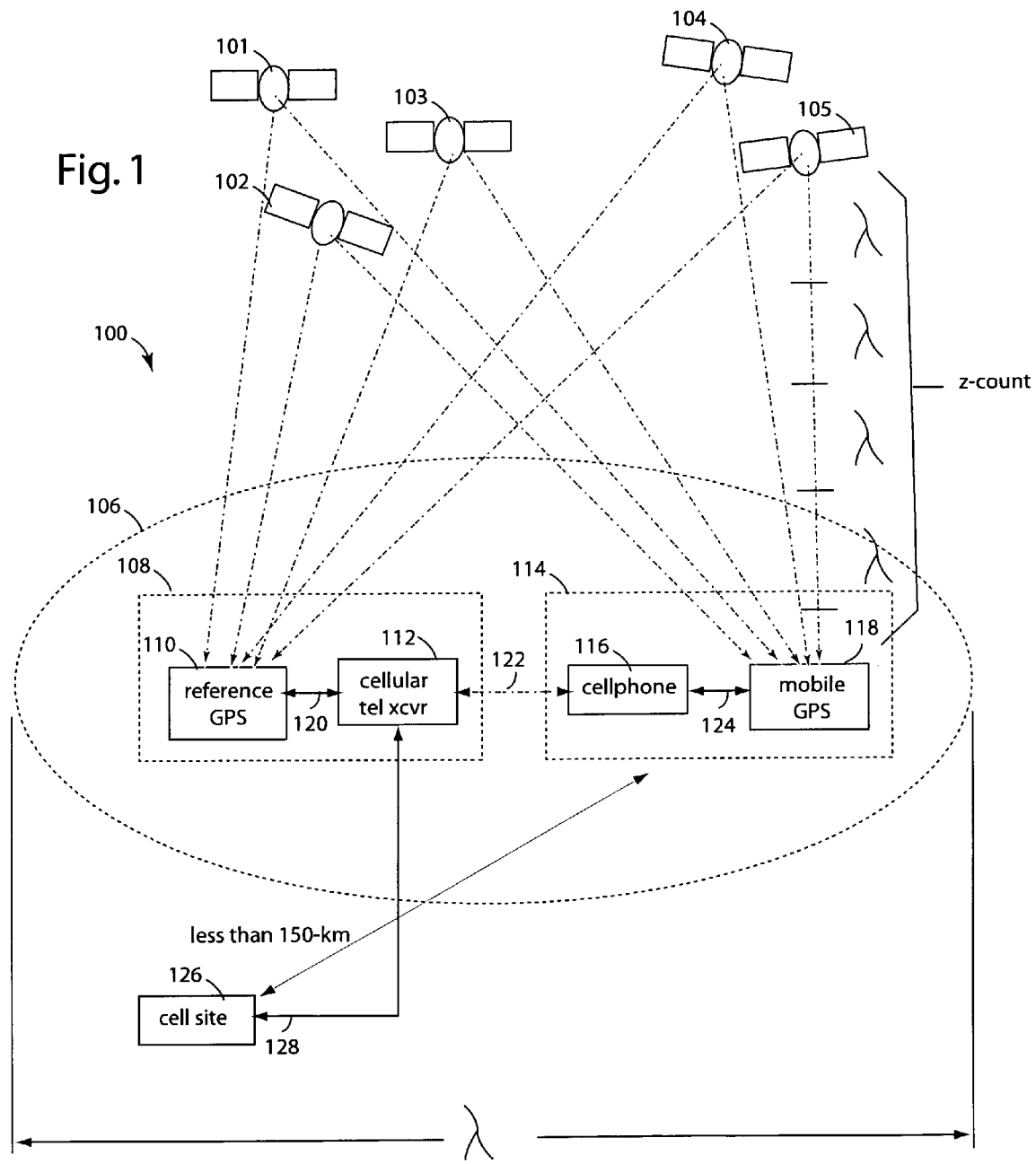

The present invention relates to navigation satellite receivers, and more particularly to methods and systems for assisting a navigation receiver initialization with satellite Doppler estimates local to an area of mobile operation.

have satellite-lock and are tracking. The telephone communication channel can be used to communicate key bits of GPS information to such cellphone-GPS-receiver combination. One of the present inventors, Paul McBurney, has recently filed several United States Patent Applications that relate to aiding GPS receiver clients. These are summarized in Table I, and all such patent applications are incorporated herein by reference.

TABLE I

| Docket Number | Title | Inventors | Issue Date | U.S. Pat. No. |
|---|---|---|---|---|
| 734-01 | Satellite Navigation Receiver and Method | P. McBurney, A. Woo | Aug. 20, 2002 | 6,437,734 |
| 734-02 | Infrastructure-Aiding for Satellite Navigation Receiver and Method | P. McBurney, A. Woo | Oct. 29, 2002 | 6,473,030 |
| 734-03 | High sensitivity GPS Receiver and Reception | P. McBurney, A. Woo | Jan. 6, 2004 | 6,674,401 |
| 734-04 | Total Correction Strategy | Stephen J, Edwards, P. McBurney | Mar. 2, 2004 | 6,701,253 |
| 734-05 | Method and System for Position Calculation from Calculated Time | S. Edwards, P. McBurney | Dec. 30, 2003 | 6,670,916 |
| 736-06 | Computing Network Path Delays so Accurate Absolute Time can be Forwarded from a Server to a Client | H. Matsushita, P. McBurney | appl. date published Aug. 21, 2003 | publ. appl. no. 20030157886 |
| 736-07 | No Preamble Frame Sync | Akira Kimura, P. McBurney | Nov. 25, 2003 | 6,654,686 |
| 736-08 | Thin Client | P. McBurney, C. Rasmussen, F. Vaucher, K. Victa | Jun. 24, 2003 | 6,584,404 |
| 736-09 | Software Crystal Oscillator | H. Matsushita, P. McBurney | Jan. 21, 2003 | 6,509,870 |
| 738-10 | High Sensitivity Infrequent Use of Sensors | P. McBurney, K. Victa | May 6, 2003 | 6,559,795 |
| 738-11 | Real Time Clock | P. McBurney | Mar. 30, 2004 | 6,714,160 |
| 738-12 | Shared Reference Station | C. Rypinski, M. Junkar | Nov. 11, 2003 | 6,647,339 |

DESCRIPTION OF THE PRIOR ART

Global positioning system (GPS) receivers use signals received from several earth-orbiting satellites in a constellation to determine user position and velocity, and other navigational data. A navigation receiver that has just been turned on does not yet know where it is, how much its crystal oscillator is in error, nor what time it is. All these are needed to find and lock onto the satellite transmissions, and so a search must be made of all the possibilities.

In order for a GPS receiver to lock onto the transmissions of visible satellites, it must know which GPS satellites are presently visible and what their velocities are relative to the GPS receiver. Otherwise, it has to search all the possibilities, and that can take a great deal of time. The satellite identification helps in selecting which CDMA-code should be used in a search. The relative velocity helps determine where the carrier will be shifted in frequency due to Doppler effects. The speeds that the GPS satellites travel can cause significant shifts in the apparent carrier frequency, and so a lot of search time and effort can be saved if the frequency search windows are initially well-centered.

A GPS receiver that is associated with a cellphone can be assisted in many ways by other GPS receivers that already A typical cellphone operates within the area of the nearest cell-site transceiver. As the cellphone moves within the operational area of the cell site, the location of the cellphone and any associated devices and persons can be assumed to be well within a 150-km radius circle centered on the cell site. And so as has been disclosed in the previous patents and patent applications of the present inventors, a first GPS receiver connected to a communication network can be a great aid to the initialization and support of other GPS receivers that also have at least occasional access to the same communication network.

SUMMARY OF THE INVENTION

It is therefore an object of the present invention to provide a method and system for assisting navigation satellite reception and receiver initialization of GPS receivers associated with cellphones.

It is another object of the present invention to provide a method and system for reducing the time necessary for a GPS receiver to initialize.

It is a further object of the present invention to provide a satellite-navigation system that is cost effective.

Briefly, a cellphone system embodiment of the present invention comprises a GPS reference station located with a telephone cell site. Such GPS reference station tracks the GPS satellites visible to its local area and estimates the Doppler for each such GPS satellite. The system further comprises mobile GPS receivers and cellphones that move around and through the operational area of the cell site. It is assumed that the satellite Dopplers seen by the GPS reference station will have insubstantial differences with the true Dopplers observed by other GPS receivers operating within the cell sites service area. The Doppler estimates are thus routinely communicated over a wireless telephone channel to the mobile GPS receivers and cellphones that register locally. Such mobile GPS receivers then can confidently adopt the surrogate Doppler estimates as a center starting point for their initialization frequency searches. The time required for such mobile GPS receivers and cellphones to initialize and provide a first fix is thereby substantially reduced.

An advantage of the present invention is that a system and method are provided that provides for quick initialization of GPS receivers associated with mobile cellular telephones.

Another advantage of the present invention is that a system and method are provided for reducing the cost navigation satellite receivers associated with mobile cellular telephones.

These and other objects and advantages of the present invention will no doubt become obvious to those of ordinary skill in the art after having read the following detailed description of the preferred embodiments which are illustrated in the various drawing figures.

IN THE DRAWINGS

FIG. 1 is a functional block diagram of a client-aided Doppler estimation system embodiment of the present invention wherein a cell site is assisting a mobile cellphone with Doppler information communicated over a wireless communications channel; and FIG. 2 is a flowchart diagram of a cellular telephone system method embodiment of the present invention.

DETAILED DESCRIPTION OF THE PREFERRED EMBODIMENT

FIG. 1 illustrates a client-aided Doppler estimation system embodiment of the present invention, and is referred to herein by the general reference numeral 100. The system 100 uses a constellation of visible GPS navigation satellites 101–105 to compute navigation solutions within a single cellular telephone cell-site service area 106. Within this service area 106 is located a cell site 108 comprising a reference GPS navigation receiver 110 and a cellular telephone transceiver 112. The reference GPS receiver 110 acts as a reference station within area 106 and stays locked onto and tracks GPS navigation satellites 101–105. In particular, the reference GPS receiver 110 computes the Doppler frequency shift for each GPS navigation satellite 101–105 relative to the fixed location of cell site 108.

A mobile device 114 includes a cellular telephone 116 and a mobile GPS receiver 118. The reference GPS receiver downloads information over a local link 120 to the cellular telephone transceiver 112. It transmits the information, including Doppler information, over a wireless communications channel 122. This is then forwarded over another connection 124 to the mobile GPS receiver 118. The Doppler information obtained this way is used by the mobile GPS receiver 118 to help in the initialization by providing a center starting apparent-carrier frequency with which to find each radio transmission from satellites 101–105.

A second mobile device 114 that is already initialized, in area 106, can be used in an alternative embodiment of the present invention to supply such Doppler information over wireless communications channel 122. In such case, the information from reference GPS navigation receiver 110 is not needed to initialize the first mobile device 114 because the second mobile device 114 acts as a mobile reference receiver.

The GPS navigation satellites 101–105 are all moving in different parts of the sky above and have different velocities. Their orbital tracking speeds, however, are all about the same. The relative speed between each satellite and each ground-based GPS receiver is what affects the apparent carrier frequency, and that is always changing each millisecond. Embodiments of the present invention assume that these computed Doppler frequency shifts for each GPS navigation satellite 101–105 will be valid for any other GPS receiver operating and trying to initialize with area 106.

In method embodiments of the present invention, the Doppler for each satellite 101–105, for example, is used to compute the center of a frequency window to be searched by a client for that satellite, e.g., mobile GPS receiver 118. The reference GPS receiver 110 and mobile GPS receiver 118 communicate within the same cell site, area 106. The position of reference GPS receiver 110 and a set of up-to-date satellite Doppler measurements are maintained at cell site 108 by reference GPS receiver 110. The satellite Doppler for all satellites at reference GPS receiver 110 is assumed to be approximately equal to the satellite Doppler for the same satellites viewed from the position of mobile GPS receiver 118.

This assumption is basically true for three reasons:
 a) Client reference GPS receiver 110 and mobile GPS receiver 118 are communicating with the same cell site area 106;
 b) The maximum possible distance between any client and its corresponding cell site is less than 150 km; and
 c) The change in satellite Doppler over a circular area with a radius of less than 150 km is negligible.

The computed position of reference GPS receiver 110 is therefore used to estimate the satellite Doppler perceived by another, e.g., mobile GPS receiver 118. If such position is fixed, such computation need only be done once and stored forever for reference. It is important to know, in real-time, the exact positions of each of the visible satellites so the relative geometry can be understood to solve the Doppler unknown. Therefore, the reference GPS receiver 110 needs to be tracking satellites 101–15 constantly and able to report instant Dopplers.

Using conventional GPS techniques, the position and velocity of a satellite can be computed based on GPS time. The computed position of reference GPS receiver 110 and the satellite position are used to form the direction cosine DC. Using the satellite velocity, $v_s$, an estimate of the perceived satellite Doppler for mobile GPS receiver 118 is computed. The estimate of satellite Doppler for mobile GPS receiver 118 is DC•$v_s$.

In an alternative method embodiment of the present invention, a most recent set of satellite Doppler measurements from reference GPS receiver 110 are converted into an estimate of the satellite Dopplers for mobile GPS receiver 118.

Consider the relation between measured Doppler and satellite Doppler:

$$v_m = DC \cdot (v_u - v_s) + d$$

where, $v_m$=Doppler measured by reference GPS receiver 110
$v_u$=user velocity of reference GPS receiver 110
$v_s$=satellite Doppler
DC=direction cosine between reference GPS receiver 110 and the measured satellite
d=clock drift of reference GPS receiver 110

Thus for a given Doppler measurement, $v_m$ and knowing a priori d, $v_u$, and DC, the estimate of satellite Doppler for mobile GPS receiver 118 is again DC·$v_s$, using the measured Doppler directly.

In still another method embodiment of the present invention, a nearby cell site 126 like cell site 108 is tracking satellites 101–105. If it is within 150-km of mobile device 114, it can also supply useful Doppler information over the Internet or a land-based telephone trunk line 128. The computed position and or Doppler measurements of cell site 126 can be used to estimate the satellite Doppler of mobile GPS receiver 118. This is true as long as the distance between cell site 126 and mobile GPS receiver 118 is less than 150-km. It is implied that the two clients are less than 150-km apart if the distance between cell site area 106 and cell site 126 plus twice the maximum possible distance between any client and its corresponding cell site is less than 150 km.

FIG. 2 outlines a cellular telephone system method embodiment of the present invention, and is referred to herein by the general reference numeral 200. The method 200 is typically used with the hardware configuration described in FIG. 1. Method 200 begins at a cell site with a step 200 in which a reference GPS receiver acquires and tracks the visible constellation of overhead GPS satellites. This function is ongoing so aiding data will always be available and fresh. A step 202 obtains Doppler, ephemeris, and GPS time information that will be useful to another GPS receiver that is initializing and is uncertain about the satellite Dopplers at that instant. Such Dopplers can be the measured Dopplers themselves, or good enough GPS time information so that the satellite ephemeredes can be used by the initializing GPS receiver to compute the Dopplers it needs. A step 206 checks for mobile cellphones that have registered at the cell site, or a nearby cell site. If the cellphone is within 150-km of the reference GPS receiver, one propagation distance of the GPS C/A-code (one millisecond), then the aiding information would be useful. A step 208 transmits the aiding information over the wireless-telephone communication channel. A cellphone begins with a step 210 in which it comes up from a cold start, e.g., it does not have a lock on any GPS satellite and therefore is uncertain about Dopplers. It may also be uncertain about GPS time, ephemeredes, etc. In a step 212 the cellphone registers in the local area and sees if aiding information is available. If available, a step 214 downloads the information and uses it to gauge the Dopplers it should use in its carrier frequency searches. A step 216 finds such carriers with the aiding information. A step 218 acquires and tracks the GPS satellites. A step 220 produces the position solutions for the cellphone user.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

What is claimed is:

1. A mobile electronics device, comprising:
a cellular telephone for downloading initialization-aiding information related to a z-count and a Doppler estimate of an orbiting overhead GPS satellite being received by a reference GPS navigation receiver and a cellular telephone transceiver within 150-km; and
a mobile GPS navigation receiver connected to receive said aiding information and able to use it to avoid having to resolve integer ambiguities and to center its initial carrier frequency search windows during its initialization;
wherein, starting with a correct z-count and said Doppler estimate reduces the time for the mobile GPS navigation receiver to initialize itself.

2. A cellular telephone system, comprising:
a cell site that includes a reference GPS navigation receiver and a cellular transceiver that are able to provide z-count Doppler, ephemeris, and GPS time information for each visible satellite;
wherein, said reference GPS navigation receiver has a fixed location and packages information useful for initializing; and
wherein said cellular transceiver transmits said information useful for visiting mobile users within 150-km of said fixed location, half the codephase propagation distance.

3. The system of claim 2, further comprising:
a cellular telephone for downloading from the cell site initialization-aiding information related to a z-count of an orbiting overhead GPS satellite; and
a mobile GPS navigation receiver connected to receive said aiding information and able to combine it with a fractional range to construct a complete starting pseudorange during its initialization;
wherein, said aiding information reduces the time for the mobile GPS navigation receiver to initialize itself.

4. A method for assisting a GPS navigation receiver to initialize itself, the method comprising the steps of:
acquiring and tracking a visible constellation of overhead GPS satellites at a cell site with a reference GPS receiver;
obtaining z-count, Doppler, ephemeris, and GPS time information useful to another GPS receiver that is initializing;
checking for any mobile cellphones that have registered at said cell site, or a nearby cell site, and that are within 150-km so that said z-count information will be useful to initialize another GPS receiver associated with said mobile cellphone which is mobile and visiting; and
transmitting a Doppler-aiding information over a wireless-telephone communication channel to said any mobile cellphones.

5. The method of claim 4, further comprising the steps of:
bringing a cellphone up from a cold start such that it does not have a lock on any GPS satellite and therefore is uncertain about z-counts;
registering said cellphone in a local area of said cell site, and that are within 150-km so that said z-count information will be useful to initialize another GPS receiver associated with said mobile cellphone which is mobile and visiting;
checking to see if aiding information is available;
downloading if available said aiding information; and
using said aiding information to reduce uncertainty and improve time to a first position solution.

6. The method of claim 4, further comprising the preliminary step of:

assuming that any satellite z-counts seen by said reference GPS navigation receiver will be the same as those that will be observed by any other GPS receivers operating within a 150-km radius service area of said cell site.

7. A cellphone system, comprising:

a GPS reference station located with a telephone cell site, and that tracks any GPS satellites visible to its local area and estimates a Doppler for each such GPS satellite;

at least one mobile GPS receiver and cellphone combination that can move around and through an operational 150-km radius area of said telephone cell site;

a transceiver for communicating at least one z-count over a wireless telephone channel to said mobile GPS receiver and cellphone combinations that register locally;

wherein said mobile GPS receiver adopts a surrogate z-count for its initialization, and any time required for initialization is substantially reduced.

8. A method of initializing a satellite navigation receiver, comprising:

(a) using a first satellite navigation receiver to, (1) acquire and track orbiting navigation satellites (202);

(2) determine a Doppler shift estimate (204) for each orbiting navigation satellite being tracked in the previous step (202);

(3) detect information requests from client users within a particular service area limited to a 150-km radius (206) such that the z-counts will be the same and not ambiguous; and (4) supply a Doppler shift estimate for each orbiting navigation satellite being tracked to said client users (208);

(b) using a second satellite navigation receiver roaming within said 150-km radius to, (1) begin its own initialization (210);

(2) contact said first satellite navigation receiver with a client user request for information (212);

(3) download Doppler shift estimates from said first satellite navigation receiver (214) and assume that the z-counts are the same to eliminate integer ambiguities;

(4) start at least one carrier-frequency search (216) for said orbiting navigation satellites with a corresponding one of said Doppler shift estimates downloaded in the previous step;

(5) acquire and track said orbiting navigation satellites (218);

(6) use the assumed z-counts to compute pseudoranges; and (7) output position solutions (220).

9. The method of claim 8, further comprising:

using a wireless telephone channel (222) in said contact to communicate said client user request for information; and responding with said wireless telephone channel (224) to download said Doppler shift estimates.

* * * * *